United States Patent
Gray

[15] 3,658,611
[45] Apr. 25, 1972

[54] PROCESS FOR DECORATING A GLASS SURFACE
[72] Inventor: Don N. Gray, Sylvania, Ohio
[73] Assignee: Owens-Illinois, Inc.
[22] Filed: Jan. 19, 1970
[21] Appl. No.: 4,095

Related U.S. Application Data

[62] Division of Ser. No. 653,020, July 13, 1967.

[52] U.S. Cl. ................................. 156/89, 156/230, 117/3.4
[51] Int. Cl. ........................................ B44c 1/16, B41m 3/12
[58] Field of Search ..................... 156/89, 230; 117/301, 3.2, 117/3.3, 3.4; 161/406 T; 260/86.1 E, 89.5 A

[56] References Cited

UNITED STATES PATENTS

| | | | |
|---|---|---|---|
| 2,502,758 | 4/1950 | Short | 117/3.2 X |
| 2,311,876 | 2/1943 | Scheetz | 156/89 |
| 3,169,079 | 2/1965 | Ferington et al. | 260/89.5 X |
| 2,628,178 | 2/1953 | Burnett et al. | 260/89.5 UX |
| 3,274,017 | 9/1966 | Borrajo | 117/3.2 |

FOREIGN PATENTS OR APPLICATIONS 613,732  12/1948  Great Britain ......................... 117/3.2

*Primary Examiner*—William D. Martin
*Assistant Examiner*—Harry J. Gwinnell
*Attorney*—E. J. Holler and Donald K. Wedding

[57] ABSTRACT

This invention relates to a decorative decal comprising a pyrolyzable film base containing a decorative organic-base ink or coating. The decal is conveniently applied to a suitable surface, e.g., a glass surface, and subjected to radiation sufficient to pyrolyze the film and cure, but not degrade, the ink, such that the ink adheres to the surface.

8 Claims, No Drawings

PROCESS FOR DECORATING A GLASS SURFACE

This application is a divisional application of copending U.S. Patent application Ser. No. 653,020, filed July 13, 1967.

This invention relates to a novel article of manufacture and a novel process for decorating a surface. More particularly, this invention relates to a novel decorative decal comprising a film substrate containing a decorative ink or coating and a process for applying the ink or coating to a decorable surface, particularly a glass or ceramic surface such as a bottle, ware, tumbler or the like.

Although decorative decals are known in the prior art, such deals have typically been applied to surfaces by means of so-called wet systems, such as a water slip decal system, wherein a decal base is mechanically removed from the decorative portion of the decal. These prior art decorative decals and methods of applying same have not been readily adaptable to high production decorating because of various problems and disadvantages, including inefficient ink transfers, inadaptability to existing labeling equipment and inefficient changeover.

The discovery of this invention has overcome many of the disadvantages of the wet systems by providing an economical dry decorative decal process capable of exact register, quick changeover, on-line decoration, efficient ink transfer, multicolor decoration, and adaptability to existing labeling equipment.

Although decorative decals have been previously applied to glass, ceramic, and like surfaces by means of dry systems, such systems have involved relatively high temperatures and have thereby been inherently limited to ceramic-base decorative coatings. Thus, for example, U.S. Pat. No. 2,512,929 discloses a process for decorating a glass surface by applying to the surface an alkyl methacrylate film-forming composition containing a ceramic-base ink and then heating the glass surface and applied film at a temperature of about 590° to 700° C. so as to volatilize the film and fuse the ink to the glass surface. Such a temperature range would inherently burn up and/or discolor an organic-base coating or ink. Furthermore, such elevated temperatures induce thermal stresses in the glass which must be subsequently removed by appropriate processing, i.e., annealing.

The instant invention overcomes the aforementioned prior art dry system limitation by providing a process which utilizes sufficiently low temperatures so that organic-base decorative compositions can be employed, thereby resulting in more flexibility in the choice of colors and higher overall quality in the desired decorative properties.

In the practice of this invention, there is provided a decorative decal comprising a thin, flexible, solid, plastic film substrate decorated with a heat curable organic-base composition, the film substrate having a decomposition or pyrolyzable temperature not exceeding the heat curable temperature of the organic-base composition. Preferably, the decomposition temperature of the film approximates the heat curable temperature of the decorative composition.

In addition, there is provided a plastic film which decomposes or pyrolyzes completely to gaseous products without passing through a broad liquid range and without leaving a noticeable carbonaceous or other like residue which would interfere with the decorating quality of the composition or which would impede the adherence of the composition to a selected surface. Furthermore, as contemplated herein, the film must also be sufficiently strong and flexible for the application of the decorative composition thereto, e.g., by gravure type printing, silk screen printing, flexographic printing, electrostatic printing, etc., and also for the subsequent application of the decorated film to the selected surface.

Optionally, the film should also have a reasonable shelf life, e.g., at least 6 months, preferably at least 1 year, at an ambient temperature of about 70° F., and resistance to solvents used as the vehicle for the decorative composition.

More particularly, in accordance with the practice of this invention, there is provided a decorable decal having a film base constructed out of a plastic or polymeric material containing selected low energy initiation sites in its polymeric chain for the unzipping thereof, such that the polymer is unstable at an energy level sufficient to cure but not degrade the decorative organic-base composition.

Preferably, the unzipping of the polymeric chain is at an energy level not exceeding that which will cure the organic-base composition.

Energy level, as used herein, is intended to include any resonably measurable molecular energy state which is related to the decomposition of the polymeric film and the curing of the organic-base composition. The most obvious energy level is temperature, which has been defined as the average molecular kinetic energy. Hereinafter, temperature level will be used as a synonym for energy level. However, the invention is not limited to temperature level alone, but is intended to include any molecular energy level or state which can be obtained by any appropriate energy from any source or means, e.g., chemical, electrical, and/or heat. Likewise, the energy can be transmitted in any form such as by electromagnetic radiation, visible or invisible, e.g., infra-red, ultra-violet, X-rays, gamma rays, and beta rays.

It is contemplated herein that the film base may be prepared from any film forming, high molecular weight polymer capable of decomposition to gaseous products below the temperature level at which the decorative ink is degraded without leaving a visible residue.

In a specific embodiment of this invention, there is provided a decorable decal having a film base constructed out of a plastic or polymeric material having oxygen atoms selectively incorporated in its molecular chain, as, for instance, peroxy linkages in the chain, in an amount sufficient to provide initiation sites for unzipping of the polymeric chain such that the polymer is thermally unstable at a temperature not exceeding the degrading temperature, preferably the curing temperature, of the decorative organic-base composition.

Preferably, the total oxygen linkage content is about 0.005 to about 1 percent by weight based on the total weight of the polymer. Higher oxygen-content polymers can be prepared and used in this invention, but there may result some lessening of shelf life.

In the practice of this invention, it has been discovered that best results are obtained using polymeric film (containing oxygen-linkages) which is a copolymer, terpolymer, or quadpolymer prepared from oxygen and at least one monomer selected from alkyl methacrylate, styrene, and alpha alkyl styrene.

Where one or more monomer(s) is selected from alkyl methacrylate, it is preferred that the alkyl contain less than seven carbon atoms, that is, from methyl to hexyl, with best results being consistently obtained with butyl.

Where one or more monomer(s) is selected from alpha alkyl styrene, the alkyl should contain less than 20 carbon atoms, that is, methyl to nonadecyl.

Although it is contemplated that the oxygen linkages may be incorporated in the polymer chain by any suitable means, such is typically accomplished by polymerizing the selected monomer(s) in the presence of an oxygen rich environment.

Examples of polymeric films contemplated herein include not by way of limitation copolymers of oxygen and a monomer selected from one of the three types noted hereinbefore and terpolymers of oxygen in combination with methyl methacrylate and n-butyl methacrylate.

The polymer may be directly prepared in the form of a film or subsequently processed by suitable means into a film, such as solvent casting or film drawing. After such film substrate has been appropriately prepared, a heat curable organic-base decorative composition is applied to one surface of the film by any convenient printing or decorating technique.

In the practice of this invention, it is contemplated using any decorative composition which has a heat curable organic-base, especially a thermosetting organic-resin base.

Typical thermosetting resins contemplated herein include not by way of limitation the epoxys, acrylics, polyamides, phenolics, urea formaldehydes, phenol formaldehydes, melamine formaldehydes, and the organopolysiloxanes.

Although either solid or liquid state resins can be used, the preferred embodiment utilizes a resin(s) which is solid at room temperature and which is soluble in a suitable printing vehicle solvent, e.g., methyl isobutyl ketone, diacetone alcohol, n-butyl acetate, toluene, 2-nitrol propane, the carbitols, such as diethylene glycol monoethyl ether, or the cellosolves, such as 2-ethoxy-ethanol-1.

The epoxy and polyamide resins have been found to be especially suitable in the practice of this invention.

Epoxy resins are characterized by having reactive epoxide groups

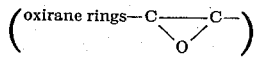

in the resin structure, and are commonly supplied in both liquid and solid form. As used herein, the term "epoxy resin" is not to be considered limiting in any manner and is to be considered inclusive of all known epoxy resins since no reason can be advanced at the present time why any epoxy resin should not be operable for the purpose of this invention.

Typical epoxy resins contemplated herein include diglycidyl ether of bisphenol A (and its homologues), glycidyl ethers of glycerol, glycidyl ethers of bisphenol F, glycidyl ethers of a long chain bisphenol, glycidyl ethers of tetrakis (hydroxyphenyl) ethane, and epoxylated nonolacs. In addition, reference is made to the epoxy resins described and set forth in the copending U.S. patent application, Ser. No. 489,734, filed Sept. 23, 1965 now abandoned, by Robert H. Kiel, and the publication "Epoxy Resins" by Henry Lee and Kris Neville, McGraw-Hill Book Co., Inc., (1957), both of which are incorporated herein by reference.

One of the characteristic features of the epoxy resins is their inherent ability to transform from a thermoplastic state to a thermoset state. This is typically accomplished by means of a curing or cross-linking agent. The curing agents may be broadly classified as amines, amides, and anhydrides including p,p'-methylene dianiline, hexamethoxy methyl melamine, 3-isopropylamino-propylamine, 1,2-diamino-propane, meta-xylene diamine, diethylamino-propylamine, diethylene triamine, triethylene diamine, 4-chloro-orthophenylene diamine, phthalic anhydride, dicyandiamide and the like.

The amount of curing agent used will depend on the nature of the epoxy resin and the kind of curing agent. For example, with cross-linking amines, the customary method is to allow one epoxy group for each active hydrogen of the agent. With fast curing liquid polyamines, the recommended concentration of the curing agent is from about 15 to about 30 phr (parts by weight of agent per 100 parts by weight of resin). With the catalyst tertiary amines, the ratio of the amines is from about 5 to 15 phr. With anhydrides, the amount will be about 0.85 to 1.1 gram mol of anhydride carboxyl per epoxy equivalent.

Polyamide type resins are generally thought of as condensation products which contain recurring amide groups. Such resins may be formed by means well known in the art, e.g., by the condensation of diamines with diacids.

Examples of polyamides contemplated in the practice of this invention include not by way of limitation the condensation products of ethylenediamine and sebacic acid, propylenediamine and sebacic acid, tetramethylenediamine and adipic acid, tetramethylenediamine and sebacic acid, pentamethylenediamine and malonic acid, pentamethylenediamine and octadecanedioic acid, hexamethylenediamine and adipic acid, octamethylenediamine and sebacic acid, decamethylenediamine and oxalic acid and the like.

Commercially available polyamide resins suitable in the practice of this invention include not by way of limitation polyamide resin SCOPE 30, which is the resinous derivative of diphenolic acid characterized by a softening temperature of 98° to 102° C., an acid value of 3.75 maximum, an amine value of 8.50 maximum, and a specific gravity of 0.99; the thermoplastic resins known commercially as VERSALON, for example, VERSALON 1112 as characterized by a softening temperature of 105° to 115° C., a tensile strength of 1,900 to 2,100 pounds per square inch at 75° F., and a specific gravity of 0.955; and the commercially available polyamide resins known as POLYMID 1144, characterized by an acid value of 3.4, an amine value of 4.8, a melting temperature of 99° to 104° C., and a specific gravity of 0.99; the polyamide resin POLYMID 1155 with an acid value of 5, an amine number of 5, and a specific gravity of 0.98; the polyamide resin POLYMID 1060 with an acid value of 4.0, an amine value of 1 to 2, a melting temperature of 112° to 113° C., and a specific gravity of 0.97; and the polyamide resin known commercially as POLYMID 1074, characterized by an acid value of less than 6, an amine value of less than 6, a melting temperature of 102° to 108° C., and a specific gravity of 0.98. Also, other polyamide thermoplastic resins may be used, such as VERSAMID 900 with an amine value of 4, a specific gravity of 0.98, and a softening temperature of 180° to 190° C., and VERSAMID 950, with an amine value of 4, a specific gravity of 0.98, and a softening temperature of 90° to 100° C.

SCOPE is a registered trademark for resinous derivatives of diphenolic acid available from S. C. Johnson and Son, Inc., Racine, Wisconsin. Technical bulletins are available which contain additional technical information including physical and chemical properties of the SCOPE resins and general procedures for preparation. Such bulletins include Technical Bulletins CD-20, Revision 2, issued June 1964, and CD-43, issued April 1963 by the Chemical Division of S. C. Johnson and Son, Inc.

VERSALON is a registered trademark for polyamide resins available from General Mills, Inc., Chemical Division, Kankakee, Illinois. Technical bulletins published by such company include CDS 4-63 and CDS 5-63, each having an effective date of Nov. 1, 1963, and such being revised on Feb. 1, 1965.

VERSAMID is a registered trademark for polyamide resins also available from General Mills, Inc., Kankakee, Illinois. Technical bulletins published by such company include VERSAMID SPECIFICATION SHEET 11, June 1, 1962.

For additional technical information on the General Mills polyamide resins, reference is made to U.S. Pat. No. 3,224,893, which is incorporated herein by reference.

The decorative coating(s) applied to the pyrolyzable polymeric film may also contain other ingredients including pigment(s) and suitable wetting and/or dispersing agent(s).

The pigments contemplated in the practice of this invention may be colored, colorless, inorganic, or organic.

Generally, the inorganic pigments include alumina hydrate, barium sulfate, calcium carbonate, chrome green, iron blues, lithopones, vermillion, white lead, magnesium carbonate, and metal oxides, such as zirconium oxide, titanium dioxide, zinc oxide, and the like.

When the pigment is a metal oxide, it is especially desirable if it is prepared by a vapor phase decomposition technique, such as the vapor phase decomposition of a titanium halide in the presence of an oxidizing or hydrolyzing agent to produce titanium oxide. If titanium oxide is used as the pigment, it is preferred to use the rutile form as distinguished from the anatase.

Organic pigments that are satisfactory for the instant coating may be chemically classified as the nitro, the azo and diazo, the nitroso and isonitroso, the oxyketone, the ketonimides and hydrazides, the triphenylamines, the azines, the quinolines, the acridine, the indanthrene and the phthalocyanine colors. In any event, the selected organic pigment(s) must not discolor or interact with the film base in a deleterious manner at the temperatures at which the film is applied to the decorable surface.

Suitable wetting and/or dispersing agents contemplated herein include lecithins, mixed fatty acid esters of phosphatidyl choline, polyethylene sorbital oleate eaurate, sodium oetylsulfate, polyethylene glycol lauryl ether, diethylene glycol monostearate and the like.

A reasonably wide range of operating temperatures is possible in the practice of this invention, depending upon which particular organic material is used as the base in the ink. Typically, most organic resins cure at a range of 400° to 450° F. and begin to degrade at about 500° F. during a time period of about 10 to 15 minutes.

In the heating operation of this invention, the decorated film may be applied to a cold (glass) surface and heat subsequently applied to the film and/or the surface. However, from the standpoint of heat economy, it may in some instances be desirable to apply the film to an already heated surface, e.g., to a glass bottle subsequent to the annealing thereof. In any event, improved film adhesion is obtained if the surface to be decorated has been previously heated slightly above ambient, e.g., about 100° F.

The thickness of the pyrolyzable film will depend upon a number of factors relating to means of preparation and printing and to the end use of the printed film. For example, the film thickness must be such that the film web has sufficient strength for (a) the selected printing process, e.g., as previously noted hereinbefore, and (b) for application of the film label to the ware.

Typically, the film will have a thickness of about 0.5 mil to about 1.0 mil. Thinner sections can be used with a proportionate sacrifice in strength. Thicker sections require longer pyrolysis periods and/or higher temperature levels to achieve complete pyrolysis.

It is contemplated herein that the decorable surface, particularly a glass surface, may preliminarily be treated with metal oxides or organic materials to improve the permanency of adherence of the ink to the surface, or that additives may be added to the ink composition to obtain a similar result. For example, reference is made to copending U.S. patent applications, Ser. Nos. 577,986; 578,137; and 578,156, filed respectively on Aug. 12, 1966, now abandoned; Sept. 9, 1966, now U.S. Pat. No. 3,522,075; and Sept. 9, 1966, now U.S. Pat. No. 3,507,680 by Robert H. Kiel.

The hereinafter examples represent some of the best modes contemplated by the inventor in the practice of this invention.

EXAMPLE I

An oxygen/n-butyl methacrylate copolymer was prepared, using the following procedure:

n-Butyl methacrylate (550 ml) was washed three times with 500 ml portions of 5% NaOH solution, then washed with four 500 ml portions of water. The washed monomer was not dried nor distilled. The monomer was placed in a three-necked reactor flask equipped with stirrer, reflex condenser, and a gas inlet tube terminating slightly below the surface of the monomer liquid. Oxygen was bubled through the monomer, with stirring, at room temperature for several minutes and then the system was heated quickly to 135° C. At this temperature initiation occurred and the temperature rose quickly to reflux (165° C.). The self-heating terminated after several minutes and the solution thickened quickly. The reaction was then cooled quickly with an ice bath. The polymer was then precipitated with methanol and dried.

The precipitated polymer was dissolved in benzene (1 gram of polymer per 1 ml of benzene). A film cast of the resulting solution was then prepared, using a smooth stainless steel base coated with a thin layer of film release agent (polyvinyl alcohol). The benzene was allowed to evaporate at ambient temperature so as to yield a strong, transparent polymer film having a thickness of about 0.8 mil.

One side or surface of the film was then decorated with a typical epoxy-base decorative ink, using a standard silk screen technique. The ink composition comprised an epoxy resin normally solid at ambient temperatures (diglycidyl ether of bisphenol A), a pigment (rutile $TiO_2$), a thickening agent (cabosil), a curing agent (p, p'-methylene dianiline), and a solvent (butyl carbitol).

The film was then applied to a glass bottle with the inked or decorated surface of the film in contact with the bottle. The bottle was then placed in an oven at 425° F. for 10 minutes. The film pyrolyzed leaving no visible residue and the ink cured and adhered to the surface of the glass bottle.

EXAMPLE II

A methyl methacrylate/n-butyl methacrylate/oxygen terpolymer was prepared using the following procedure:

n-butyl methacrylate and methyl methacrylate were washed free of inhibitor as described in Example I. A monomer charge of 20 mole percent methyl methacrylate and 80 mole percent n-butyl methacrylate was used and the polymerization carried out essentially as in Example I. The reaction was carried to approximately 50 percent conversion and the polymer isolated via methanol precipitation. A film cast was then prepared and decorated with an epoxy resin-base ink as in Example I.

The decorated film was then applied to a glass bottle and the bottle placed in an oven (heated to 425° F.) for 10 minutes. The film pyrolyzed, leaving no visible residue and the ink cured and adhered to the surface of the glass bottle.

Although this invention has been described in terms of a specific embodiment, e.g., using a polymeric material having oxygen atoms selectively incorporated in its molecular chain, the invention is not intended to be so limited. Thus, it is contemplated that initiation sites other than oxygen linkages may be provided and used in the practice of this invention including, for example, nitrogen atoms. Such other initiation sites may be in addition to, in lieu of, or in chemical combination with each other and/or the oxygen linkages.

Accordingly, although this invention has been illustrated with reference to specific embodiments, it will be obvious to those skilled in the art that other embodiments and modifications hereof can be made within the scope and spirit of the invention.

I claim:

1. A process for decorating a glass surface which comprises applying to a glass surface a solid polymeric film of a copolymer, terpolymer, or quadpolymer prepared from oxygen and at least one monomer of alkyl methacrylate, styrene, or alpha alkyl styrene and containing a heat curable organic resin-base decorative composition, said film having selected low energy initiation sites in its molecular chain for the decomposition thereof at an energy level not exceeding that required to cure the decorative composition, and transmitting energy to said film and composition in an amount sufficient to decompose the film and cure but not degrade the composition, and thereby decorating the glass surface.

2. The process of claim 1 wherein energy is transmitted to the film and composition in an amount sufficient to provide a temperature of 400° to 450° F.

3. In a dry process for decorating a glass surface with a decorative decal comprising a film substrate and an inorganic ceramic-base ink wherein the decal is heated while in contact with the glass surface to a temperature of at least 1,000° F. such that the film is decomposed to gaseous products and the ink is fused to the glass, the improvement which comprises preparing the decal out of a low temperature decomposable polymeric film having oxygen atoms selectively incorporated in its molecular chain and a ceramic-base ink containing a heat curable organic resin and heating the decal while in contact with the glass to a temperature below 500° F. sufficient to decompose the film and cure without degrading the ink, said film being a copolymer, terpolymer or quadpolymer prepared from oxygen and at least one monomer of alkyl methacrylate, styrene, or alpha alkyl styrene.

4. The process of claim 3 wherein the heat curable resin of said ink is epoxy, acrylic, polyamide, phenolic, urea formaldehyde, phenol formaldehyde, melamine formaldehyde, or organopolysiloxane.

5. The improvement of claim 3 wherein the molecular oxygen content of the film is about 0.005 to about 1 percent by weight based on the total weight of the film.

6. The improvement of claim 5 wherein the resin is curable at a temperature of 400° to 450° F.

7. The process of claim 3 wherein the film is capable of decomposition to gaseous products without passing through a broad liquid range.

8. The process of claim 7 wherein the film has a thickness of about 0.5 to about 1.0 mil.

* * * * *